US010855435B2

(12) United States Patent
Tanikawa

(10) Patent No.: US 10,855,435 B2
(45) Date of Patent: Dec. 1, 2020

(54) COMMUNICATION APPARATUS, GENERATED DATA SIZE CONTROLLING METHOD, AND PROGRAM

(71) Applicant: Sony Interactive Entertainment Inc., Tokyo (JP)

(72) Inventor: Masakazu Tanikawa, Chiba (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/466,151

(22) PCT Filed: Jan. 11, 2018

(86) PCT No.: PCT/JP2018/000438
§ 371 (c)(1),
(2) Date: Jun. 3, 2019

(87) PCT Pub. No.: WO2018/135364
PCT Pub. Date: Jul. 26, 2018

(65) Prior Publication Data
US 2020/0067691 A1 Feb. 27, 2020

(30) Foreign Application Priority Data
Jan. 18, 2017 (JP) ................. 2017-006892

(51) Int. Cl.
*H04L 5/16* (2006.01)
*H04L 5/14* (2006.01)
(Continued)

(52) U.S. Cl.
CPC ............. *H04L 5/16* (2013.01); *H04L 5/1469* (2013.01); *H04N 21/436* (2013.01); *H04W 28/06* (2013.01)

(58) Field of Classification Search
CPC ....... H04L 5/16; H04L 21/304; H04L 5/1469; H04W 28/06
(Continued)

(56) References Cited

U.S. PATENT DOCUMENTS 9,106,286 B2 * 8/2015 Agee ................ H04B 7/0413
10,236,971 B2 3/2019 Ui
(Continued)

FOREIGN PATENT DOCUMENTS

JP 2012141685 A 7/2012
JP 2016206989 A 12/2016
(Continued)

OTHER PUBLICATIONS

Notification of Reasons for Refusal for corresponding JP Application No. 2018-563287, 10 pages, dated Nov. 12, 2019.
(Continued)

Primary Examiner — Phong La
(74) Attorney, Agent, or Firm — Matthew B. Dernier, Esq.

(57) ABSTRACT

There are provided a communication apparatus, a generated data size controlling method, and a program for bringing a time required for a round-trip half-duplex communication close to a predetermined target time. A video data transmission section transmits data generated by a video data generation section to an HMD. A sensing data reception section receives data transmitted from the HMD. A required time identification section identifies the time required for the round-trip half-duplex communication between a repeating apparatus and the HMD. A generation control section controls a size of the data generated per unit time by the video data generation section on a basis of the identified time, the
(Continued)

size of the data exchanged with the HMD in a round-trip communication, and a predetermined target time for the round-trip communication.

7 Claims, 6 Drawing Sheets

(51) Int. Cl.
 *H04N 21/436* (2011.01)
 *H04W 28/06* (2009.01)
(58) Field of Classification Search
 USPC .......................................................... 370/329
 See application file for complete search history.

(56) References Cited

U.S. PATENT DOCUMENTS

| | | | |
|---|---|---|---|
| 10,504,247 B2 | 12/2019 | Sugimoto | |
| 2005/0078672 A1* | 4/2005 | Caliskan | H04L 45/42 370/389 |
| 2005/0120079 A1* | 6/2005 | Anderson | H04L 69/24 709/203 |
| 2005/0213593 A1* | 9/2005 | Anderson | H04L 29/06027 370/419 |
| 2007/0195828 A1* | 8/2007 | Matsumoto | H04M 11/062 370/498 |
| 2008/0170500 A1* | 7/2008 | Ito | H04L 47/2416 370/235 |
| 2011/0013681 A1* | 1/2011 | Zou | G09G 5/006 375/222 |
| 2012/0028642 A1* | 2/2012 | Schliwa-Bertling | C12N 5/0686 455/436 |
| 2012/0166670 A1 | 6/2012 | Kure | |
| 2016/0358381 A1* | 12/2016 | Ui | H04B 7/26 |
| 2017/0142610 A1* | 5/2017 | Nihei | H04L 5/0044 |
| 2017/0188063 A1* | 6/2017 | Takahashi | H04N 21/4348 |
| 2018/0033163 A1 | 2/2018 | Sugimoto | |
| 2019/0174466 A1* | 6/2019 | Zhang | H04L 5/005 |

FOREIGN PATENT DOCUMENTS

| | | |
|---|---|---|
| JP | 2017005372 A1 | 1/2017 |
| WO | 2010082208 A2 | 7/2010 |

OTHER PUBLICATIONS

International Search Report for corresponding PCT Application No. PCT/JP2018/000438, 2 pages, dated Mar. 20, 2018.
Extended European Search Report for corresponding EP Application No. 18741620.1, 9 pages, dated Dec. 20, 2019.

* cited by examiner

F I G . 5
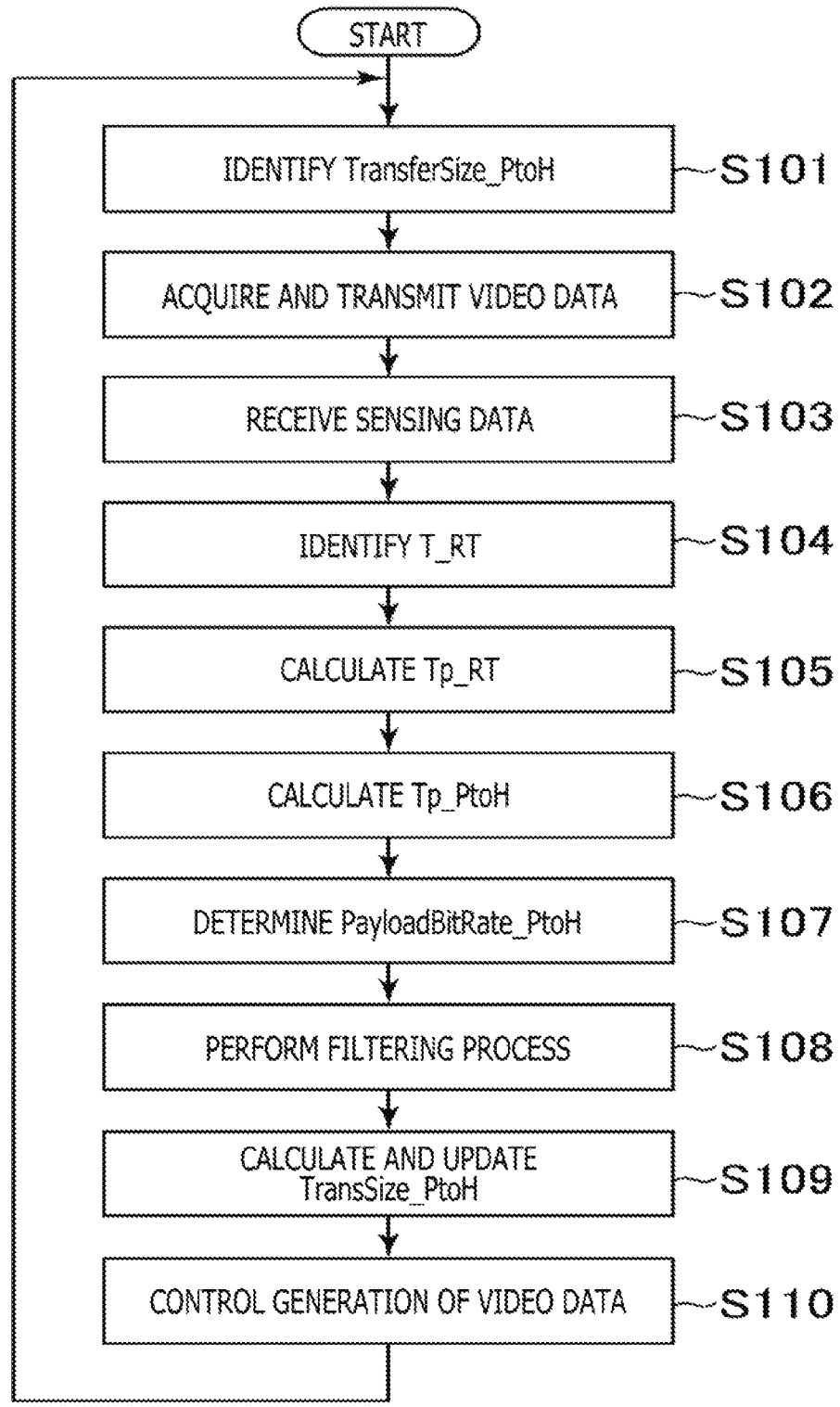

COMMUNICATION APPARATUS, GENERATED DATA SIZE CONTROLLING METHOD, AND PROGRAM

TECHNICAL FIELD

The present invention relates to a communication apparatus, a generated data size controlling method, and a program.

BACKGROUND ART

In recent years, head-mounted displays (HMD) which are worn on the head and which permit visual appreciation of video in front of one's eyes have been becoming popular. Of these HMDs, some are connected by a cable with an entertainment apparatus that executes programs including video game programs, the HMD receiving and displaying the video generated by the entertainment apparatus.

Of the entertainment apparatus-connected HMDs, some are configured to change the displayed video in keeping with the movement of the user's head. These HMDs are equipped with motion sensors and cameras, for example. With its motion sensors and cameras, the HMD generates sensing data such as the data representing the results of detection by the motion sensors and images captured by the cameras, the generated sensing data being transmitted to the entertainment apparatus. Upon receipt of the sensing data, the entertainment apparatus generates video on the basis of the sensing data and sends the generated video to the HMD. In turn, the HMD displays the received video, allowing the user to visually appreciate the video being changed in keeping with the movement of the user's head.

SUMMARY

Technical Problem

The inventors have considered getting half-duplex wireless communication channels according to the Wi-fi (registered trademark) or similar standards to be included in the communication channels between the entertainment apparatus and the HMD. In half-duplex wireless communication, data transmission from the apparatus on the transmitting side (called the communication apparatus hereunder) to the apparatus on the receiving side (called the communication partner apparatus hereunder) alternates with data transmission from the communication partner apparatus to the communication apparatus. In the above example, video data transmission from the entertainment apparatus to the HMD alternates with sensing data transmission from the HMD to the entertainment apparatus.

The data for use by the communication partner apparatus, such as the data representing the video generated by the above-mentioned entertainment apparatus, should preferably be of as high quality as possible. For example, the video to be displayed on the HMD used in the above-described manner should preferably be of the highest quality possible. Thus, the size of the data generated per unit time such as the data making up the video generated by the entertainment apparatus should preferably as large as possible.

On the other hand, in communications such as the one above demanding instantaneity, it is important to bring the time required for a round-trip communication close to a predetermined target time, even by reduction of the size of data generated per unit time, in order to minimize the user's feeling of discomfort.

An object of the present invention is to provide a communication apparatus, a generated data size controlling method, and a program for bringing the time required for a round-trip communication to a predetermined target time in a half-duplex wireless communication configuration.

Solution to Problem

In solving the above problem and according to the present invention, there is provided a communication apparatus for performing half-duplex wireless communication with a communication partner apparatus. The communication apparatus includes: a transmission section configured to transmit data generated by a data generation section to the communication partner apparatus; a reception section configured to receive data transmitted from the communication partner apparatus; a time identification section configured to identify a time required for a round-trip half-duplex wireless communication between the communication apparatus and the communication partner apparatus; and a generation control section configured to control a size of the data to be generated per unit time by the data generation section on a basis of the identified time, the size of the data exchanged with the communication partner apparatus in the round-trip communication, and a predetermined target time for the round-trip communication.

In one mode of the present invention, the reception section receives sensing data transmitted from the communication partner apparatus. The data generation section generates video data. The generation control section controls a quality of the video data.

In another mode of the present invention, the communication apparatus further includes a bit rate determination section configured to determine a bit rate for permitting data transmission from the communication apparatus to the communication partner apparatus in a subsequent round-trip communication in accordance with the identified time, the size of the data exchanged with the communication partner apparatus in the round-trip communication, and the predetermined target time for the round-trip communication. The generation control section controls the size of the data generated per unit time by the data generation section in accordance with the determined bit rate.

In the above mode, in a case where the bit rate for permitting data transmission from the communication apparatus to the communication partner apparatus in the round-trip communication is lower than a threshold value, the transmission section may transmit to the communication partner apparatus an instruction to reduce the size of the data to be transmitted per unit time in the subsequent round-trip communication.

Furthermore, the threshold value may reflect either a distance between the communication apparatus and the communication partner apparatus or a direction of the communication partner apparatus relative to the communication apparatus.

According to the present invention, there is also provided a communication apparatus for performing half-duplex wireless communication with a communication partner apparatus. The communication apparatus includes: a reception section configured to receive data generated by a data generation section from a communication partner apparatus; and a transmission section configured to transmit data to the communication partner apparatus. The communication partner apparatus includes: a time identification section configured to identify a time required for a round-trip half-duplex wireless communication between the communication apparatus and the communication partner apparatus; and a generation control section configured to control the size of the data to be generated per unit time by the data generation section on a basis of the identified time, the size of the data exchanged with the communication partner apparatus in the round-trip communication, and a predetermined target time for the round-trip communication.

Also, according to the present invention, there is provided a generated data size controlling method including the steps of: transmitting data generated by a data generation section to a communication partner apparatus; receiving data transmitted from the communication partner apparatus; identifying a time required for a round-trip half-duplex wireless communication between the communication apparatus and the communication partner apparatus; and controlling a size of the data to be generated per unit time by the data generation section on a basis of the identified time, the size of the data exchanged with the communication partner apparatus in the round-trip communication, and a predetermined target time for the round-trip communication.

Also, according to the present invention, there is provided a program for causing a computer to perform a procedure including: identifying a time required for a round-trip half-duplex wireless communication between a communication apparatus transmitting data generated by a data generation section to a communication partner apparatus by half-duplex wireless communication and the communication partner apparatus transmitting data to the communication apparatus; and controlling a size of the data to be generated per unit time by the data generation section on a basis of the identified time, the size of the data exchanged with the communication partner apparatus in the round-trip communication, and a predetermined target time for the round-trip communication.

BRIEF DESCRIPTION OF DRAWINGS

FIG. 5 is a flowchart depicting a first example of the flow of processing performed by the repeating apparatus of the embodiment of the present invention.

DESCRIPTION OF EMBODIMENT

One embodiment of the present invention is described below with reference to the accompanying drawings.

Figure 1:
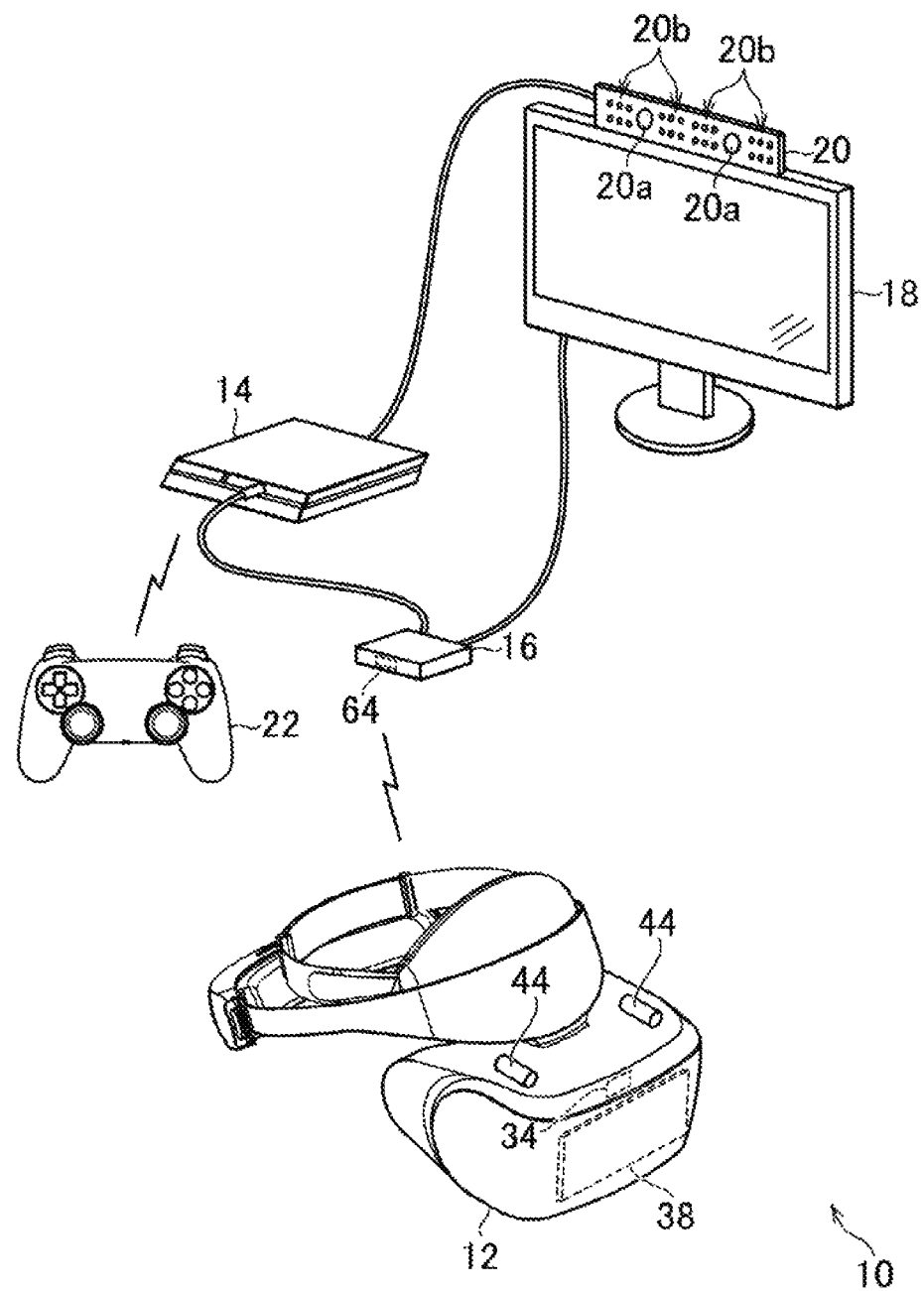
FIG. 1 is a schematic diagram depicting a typical overall configuration of an entertainment system as an embodiment of the present invention.
Figure 2A:
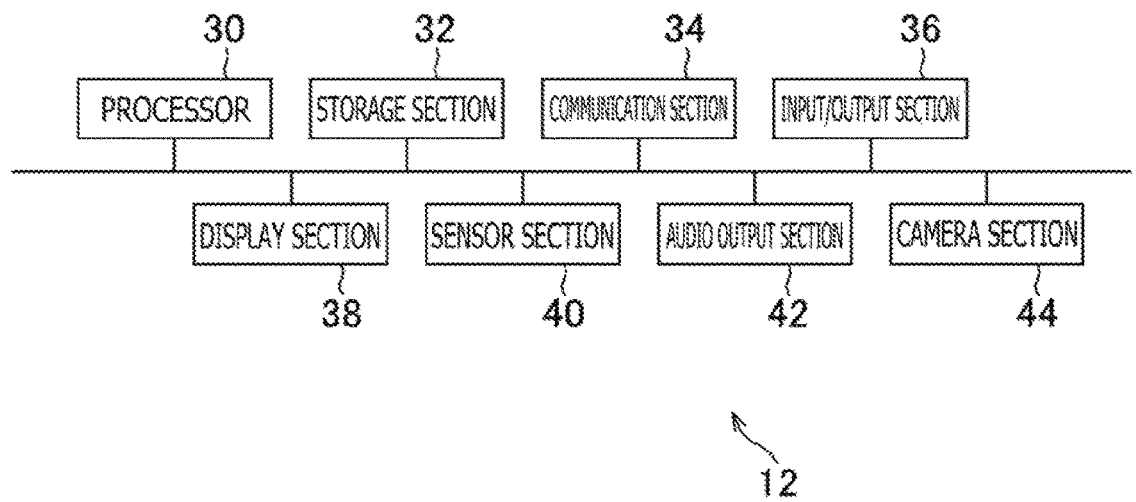
FIG. 2A is a schematic diagram depicting a typical configuration of a head-mounted display of the embodiment of the present invention.
Figure 2B:
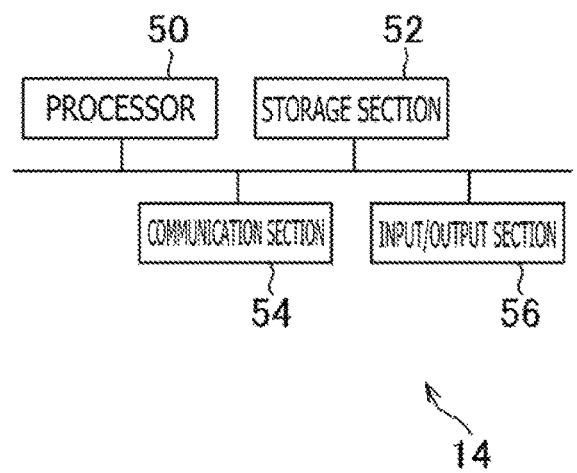
FIG. 2B is a schematic diagram depicting a typical configuration of an entertainment apparatus of the embodiment of the present invention.
Figure 2C:
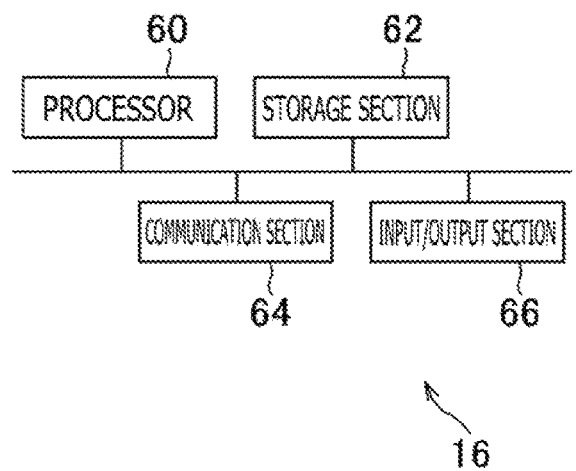
FIG. 2C is a schematic diagram depicting a typical configuration of a repeating apparatus of the embodiment of the present invention.

FIG. 1 is a schematic diagram depicting a typical overall configuration of an entertainment system 10 as one embodiment of the present invention. FIG. 2A is a schematic diagram depicting a typical configuration of a head-mounted display (HMD) 12 of this embodiment. FIG. 2B is a schematic diagram depicting a typical configuration of an entertainment apparatus 14 of this embodiment. FIG. 2C is a schematic diagram depicting a typical configuration of a repeating apparatus 16 of this embodiment.

As depicted in FIG. 1, the entertainment system 10 embodying the present invention includes the HMD 12, the entertainment apparatus 14, the repeating apparatus 16, a display 18, a camera/microphone unit 20, and a controller 22.

The HMD 12 of this embodiment includes, as depicted in FIG. 2A, a processor 30, a storage section 32, a communication section 34, an input/output section 36, a display section 38, a sensor section 40, an audio output section 42, and a camera section 44.

The processor 30 is a program-controlled device such as a microprocessor that functions in accordance with the programs installed in the HMD 12, for example. Alternatively, the HMD 12 may include, in place of the processor 30, control circuits capable of implementing the processes to be executed by the processor 30.

The storage section 32 is a storage element such as a read only memory (ROM) or a random access memory (RAM). The storage section 32 stores, among others, the programs to be executed by the processor 30.

The communication section 34 is a communication interface such as a wireless local area network (LAN) module. In this embodiment, as depicted in FIG. 1, the communication section 34 is disposed on the front top of the HMD 12.

The input/output section 36 is an input/output port such as a high-definition multimedia interface (HDMI) (registered trademark) port, a universal serial bus (USB) port, or an auxiliary (AUX) port.

The display section 38 is disposed on the front side of the HMD 12. For example, this is a display such as a liquid crystal display or an electroluminescence (EL) display that displays, among others, the video generated by the entertainment apparatus 14. The display section 38 is housed in the enclosure of the HMD 12. The display section 38 may receive a video signal output by the entertainment apparatus 14 and repeated by the repeating apparatus 16, for example, so as to output video represented by the video signal. The display section 38 of this embodiment is configured to display a right-eye image and a left-eye image in such a manner as to present a three-dimensional image. Alternatively, the display section 38 may not be configured to display three-dimensional images and may display solely two-dimensional images.

The sensor section 40 includes sensors such as motion sensors capable of detecting acceleration and angular velocity, for example. The sensor section 40 outputs the results of detection such as the amounts of rotation and displacement of the HMD 12 to the processor 30 at a predetermined sampling rate.

The audio output section 42 includes speakers such as headphones or earphones disposed near the user's ears, the speakers outputting sounds represented by audio data generated by the entertainment apparatus 14, for example. The audio output section 42 receives an audio signal output by the entertainment apparatus 14 and repeated by the repeating apparatus 16 so as to output the sound represented by the audio signal.

The camera section 44 includes cameras such as digital cameras that capture images of the surroundings of the user wearing the HMD 12 at a predetermined frame rate. As depicted in FIG. 1, the camera section 44 of this embodiment has two cameras disposed on the top of the display section 38 to capture images in front of the display section 38. Disposed in this manner, the camera section 44 of this embodiment is capable of capturing images in front of the user wearing the HMD 12. Also, the camera section 44 of this embodiment serves as a stereo camera equipped with lenses for capturing the left-eye image and generating the right-eye image.

The entertainment apparatus 14 of this embodiment is a computer such as a game console, a digital versatile disc (DVD) player, or a Blu-ray (registered trademark) player. The entertainment apparatus 14 of this embodiment generates video and sounds by executing stored video game programs or by reproducing content recorded on an optical disk, for example. The entertainment apparatus 14 of this embodiment then outputs the video signal representing generated images and the audio signal representing generated sounds to the HMD 12 and to the display 18 by way of the repeating apparatus 16.

The entertainment apparatus 14 of this embodiment includes a processor 50, a storage section 52, a communication section 54, and an input/output section 56 as depicted in FIG. 2B, for example.

The processor 50 is a program-controlled device such as a central processing unit (CPU) that functions in accordance with the programs stored in the entertainment apparatus 14, for example. The processor 50 of this embodiment includes a graphics processing unit (GPU) that renders images in a frame buffer on the basis of graphics commands and data supplied from the CPU. Alternatively, the entertainment apparatus 14 may include, in place of the processor 50, control circuits capable of implementing the processes to be executed by the processor 50.

The storage section 52 is a storage element such as a ROM or a RAM, or a hard disk drive, for example. The storage section 52 stores, among others, the programs to be executed by the processor 50. Also, the storage section 52 of this embodiment provides a frame buffer area in which images are rendered by the GPU.

The communication section 54 is a communication interface such as a wireless LAN module.

The input/output section 56 is an input/output port such as an HDMI port or a USB port.

The repeating apparatus 16 of this embodiment is a computer that repeats the video and audio signals output from the entertainment apparatus 14 and outputs the repeated signals to the HMD 12 and to the display 18.

The repeating apparatus 16 of this embodiment includes a processor 60, a storage section 62, a communication section 64, and an input/output section 66 as depicted in FIG. 2C, for example.

The processor 60 is a program-controlled device such as a microprocessor that functions in accordance with the programs installed in the repeating apparatus 16, for example. Alternatively, the repeating apparatus 16 may include, in place of the processor 60, control circuits capable of implementing the processes to be executed by the processor 60.

The storage section 62 is a storage element such as a ROM or a RAM. The storage section 62 stores, among others, the programs to be executed by the processor 60.

The communication section 64 is a communication interface such as a wireless LAN module. In this embodiment, as depicted in FIG. 1, the communication section 64 is disposed in front of the repeating apparatus 16.

The input/output section 66 is an input/output port such as an HDMI port or a USB port.

The display 18 of this embodiment is a liquid crystal display, for example, that displays, among others, the video represented by the video signal output from the entertainment apparatus 14.

The camera/microphone unit 20 of this embodiment includes cameras 20a that output to the entertainment apparatus 14 the data representing what the surroundings of the camera/microphone unit 20 look like, such as images captured of a target object. Also, the cameras 20a of this embodiment constitute a stereo camera. The camera/microphone unit 20 of this embodiment further includes microphones 20b that collect ambient sounds, convert the collected sounds into audio data, and outputs the audio data to the entertainment apparatus 14.

The HMD 12 and the repeating apparatus 16 are capable of exchanging data with each other by wireless communication, for example. The entertainment apparatus 14 and the repeating apparatus 16 are interconnected by an HDMI cable or by a USB cable, for example. The repeating apparatus 16 and the display 18 are interconnected by an HDMI cable, for example. The entertainment apparatus 14 and the camera/microphone unit 20 are interconnected by an AUX cable, for example.

The controller 22 of this embodiment is an operation input apparatus for performing input operations on the entertainment apparatus 14. The user may perform various input operations on the controller 22 by pressing its arrow keys or buttons or by tilting its operating sticks. In this embodiment, the controller 22 outputs the input data associated with the input operations to the entertainment apparatus 14. The controller 22 of this embodiment is equipped with a USB port. When connected by a USB cable with the entertainment apparatus 14, the controller 22 outputs the input data to the entertainment apparatus 14 in wired fashion. The controller 22 of this embodiment is also equipped with a wireless communication module, for example, that outputs the input data wirelessly to the entertainment apparatus 14.

The entertainment apparatus 14 of this embodiment executes, for example, programs including video game programs. The entertainment apparatus 14 then generates video such as that of a three-dimensional virtual space reflecting the execution state of the ongoing program. The video presents, for example, how things look in the direction viewed from a point of view established in the virtual space. Video data representing the video generated by the entertainment apparatus 14 is transmitted from the entertainment apparatus 14 to the HMD 12 by way of the repeating apparatus 16.

Also in this embodiment, the HMD 12 generates sensing data. The sensing data here includes, for example, the data indicating the results of detection of acceleration and angular velocity by the sensor section 40 and the images captured by the camera section 44. The sensing data generated by the HMD 12 is transmitted to the entertainment apparatus 14 via the repeating apparatus 16.

The entertainment apparatus 14 generates the video reflecting the sensing data received from the HMD 12. The entertainment apparatus 14 changes, for example, the position of the viewpoint and the line of sight therefrom in the virtual space in accordance with the sensing data received from the HMD 12. The entertainment apparatus 14 then generates the video presenting how things look in the changed line of sight from the position of the changed viewpoint, before transmitting the video to the HMD 12. Upon receipt of the video, the HMD 12 causes the display section 38 to display the video. In this manner, the embodiment causes the video displayed on the display section 38 to change in keeping with the movement of the user's head.

Figure 3:
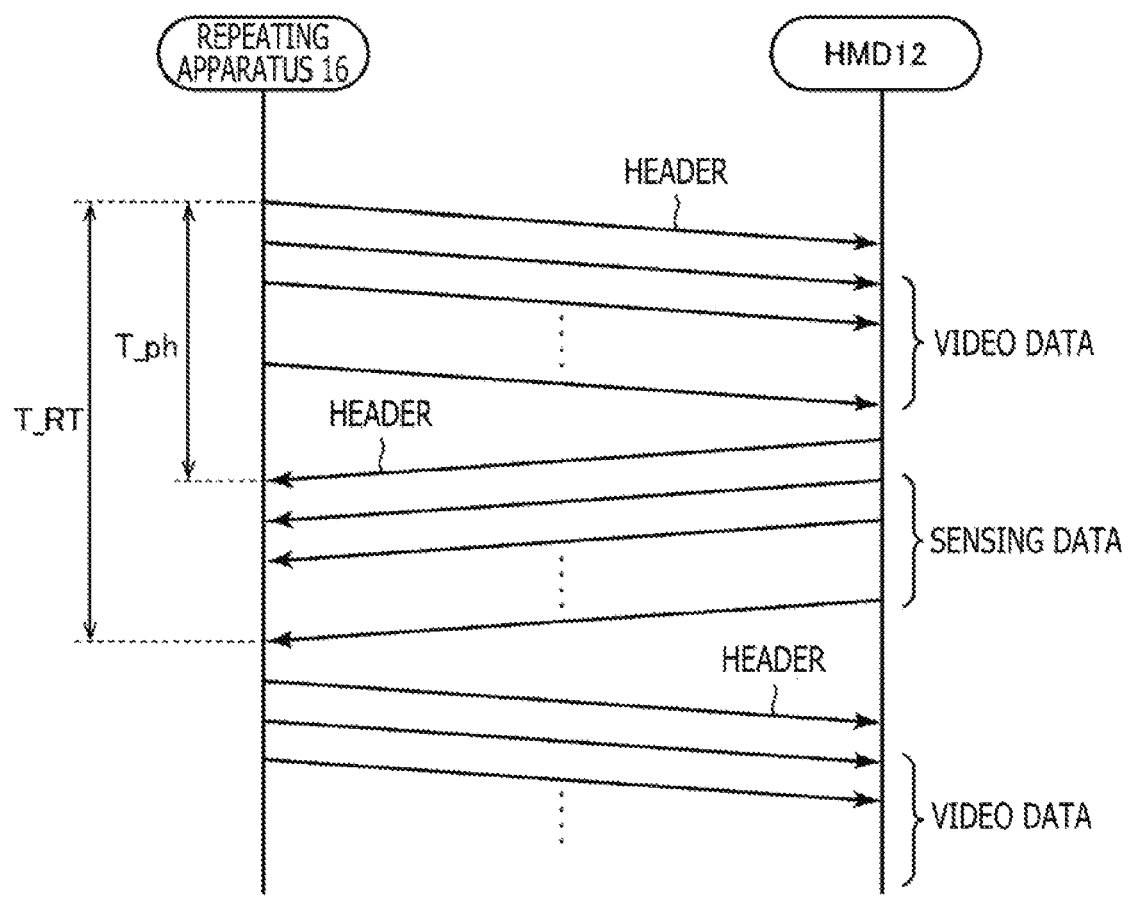
FIG. 3 is a schematic diagram schematically depicting an example of how half-duplex wireless communication takes place between the repeating apparatus and the HMD.

In this embodiment, half-duplex wireless communication as per, for example, the Wi-fi (registered trademark) or similar standards takes place between the repeating apparatus 16 and the HMD 12. FIG. 3 schematically depicts an example of what takes place during half-duplex wireless communication between the repeating apparatus 16 and the HMD 12.

In this embodiment, as depicted in FIG. 3, video data transmission from the repeating apparatus 16 to the HMD 12 alternates with sensing data transmission from the HMD 12 to the repeating apparatus 16. As illustrated in FIG. 3, the repeating apparatus 16 first transmits a header followed by video data to the HMD 12. Upon receipt of the video data, the HMD 12 transmits a header followed by sensing data to the repeating apparatus 16. Incidentally, communications of data other than the data discussed above such as control data may take place between the repeating apparatus 16 and the HMD 12.

Also in this embodiment, as depicted in FIG. 3, the repeating apparatus 16 is capable of identifying a time period from the time the repeating apparatus 16 transmits the header of the video data until the repeating apparatus 16 receives the entire sensing data returned upon receipt of the video data by the other party in a round-trip communication (i.e., round-trip time). In the description that follows, this time period will be referred to as the time T_RT.

Also in this embodiment, as illustrated in FIG. 3, the repeating apparatus 16 is capable of identifying a time period from the time the repeating apparatus 16 transmits the header of the video data until the header of the sensing data is received from the HMD 12 upon completion of the video data reception thereby. This time period corresponds approximately to the time required to transmit the video data from the repeating apparatus 16 to the HMD. This time period will be referred to as the time T_ph hereunder.

Also, this embodiment has a predetermined target time established for a round-trip half-duplex wireless communication. This target time will be referred to as TargetTransferTime hereunder.

The data for use by the HMD 12 such as the video data of this embodiment should preferably be of as high quality as possible. Thus, the size of the data generated per unit time by the entertainment apparatus 14 should preferably as large as possible. On the other hand, in communications such as that of this embodiment demanding instantaneity, it is important to bring the round-trip time close to the time TargetTransferTime, even by reduction of the size of the data generated per unit time, in order to minimize the user's feeling of discomfort. For example, it is important to minimize the latency of each of the frame images constituting the video to be displayed on the HMD 12.

Considering the above points, this embodiment controls the size of the data generated per unit time by the entertainment apparatus 14 in such a manner as to bring the time T_RT as below the time TargetTransferTime as possible, as described below.

What follow is a further description of the functions of the entertainment system 10 of this embodiment as well as the processes performed thereby mainly with a view to controlling the size of the data generated per unit time by the entertainment apparatus 14.

Figure 4:
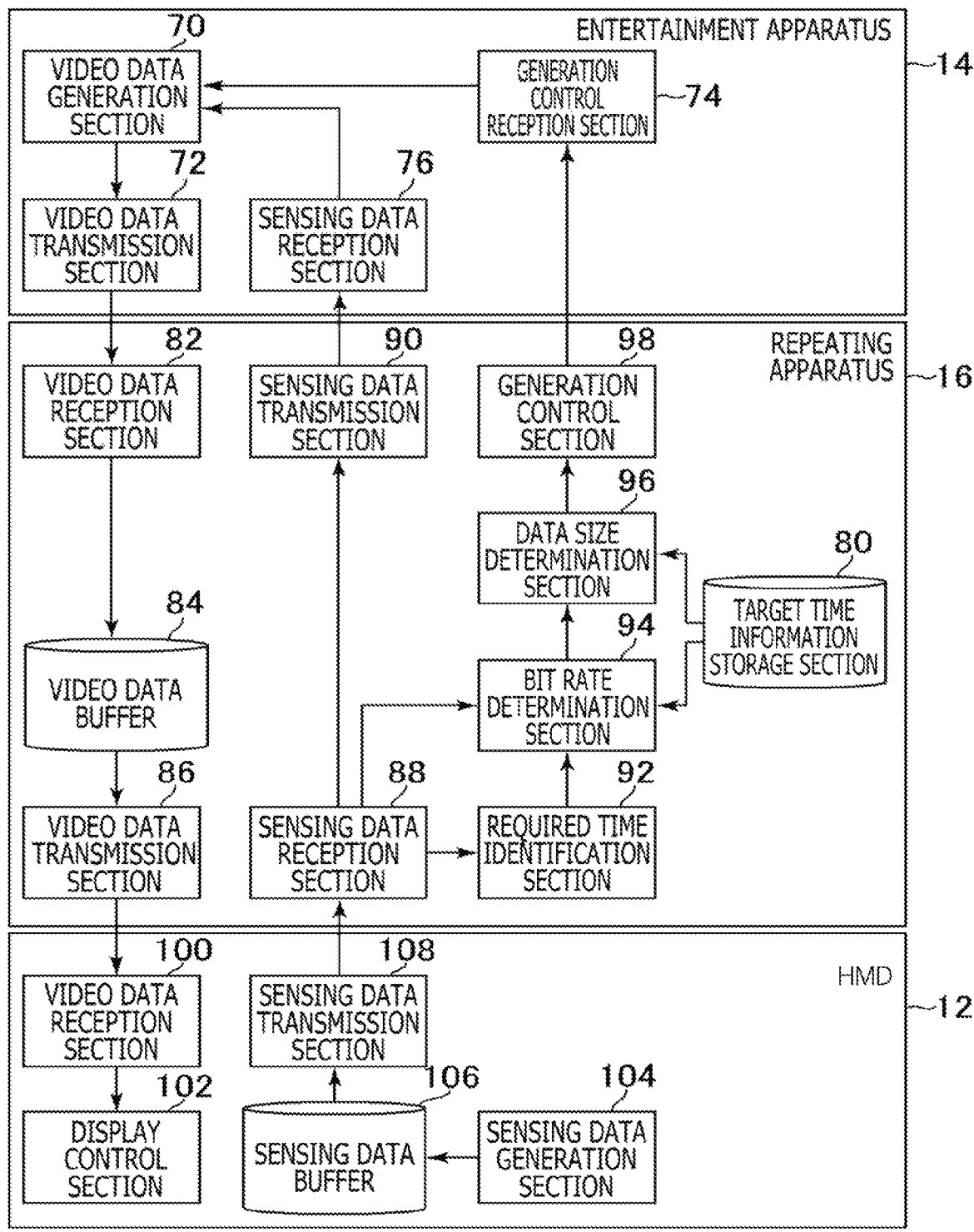
FIG. 4 is a functional block diagram depicting typical functions implemented by the head-mounted display, entertainment apparatus, and repeating apparatus of the embodiment of the present invention.

FIG. 4 is a functional block diagram depicting typical functions implemented by the HMD 12, entertainment apparatus 14, and repeating apparatus 16 of this embodiment. It is to be noted that not all functions depicted in FIG. 4 need to be necessarily implemented by the entertainment system 10 of this embodiment and that functions other than those in FIG. 4 may also be implemented.

As depicted in FIG. 4, the entertainment apparatus 14 of this embodiment includes, functionally, for example, a video data generation section 70, a video data transmission section 72, a generation control reception section 74, and a sensing data reception section 76. The video data generation section 70 is implemented using mainly the processor 50. The video data transmission section 72, generation control reception section 74, and sensing data reception section 76 are implemented using mainly the input/output section 56.

The above-mentioned functions may also be implemented by the processor 50 executing programs which are installed in the entertainment apparatus 14 as a computer and which include commands corresponding to these functions. The programs may be supplied to the entertainment apparatus 14 by means of computer-readable information storage media such as optical disks, magnetic disks, magnetic tapes, magneto-optical disks or flash memories, or via the Internet, for example.

Also as depicted in FIG. 4, the repeating apparatus 16 of this embodiment includes, functionally, for example, a target time information storage section 80, a video data reception section 82, a video data buffer 84, a video data transmission section 86, a sensing data reception section 88, a sensing data transmission section 90, a required time identification section 92, a bit rate determination section 94, a data size determination section 96, and a generation control section 98. The target time information storage section 80 and the video data buffer 84 are implemented using mainly the storage section 62. The video data reception section 82 and the sensing data transmission section 90 are implemented using mainly the input/output section 66. The video data transmission section 86 and the sensing data reception section 88 are implemented using mainly the communication section 64. The required time identification section 92, bit rate determination section 94, and data size determination section 96 are implemented using mainly the processor 60. The generation control section 98 is implemented using mainly the processor 60 and the input/output section 66.

The above-mentioned functions may also be implemented by the processor 60 executing programs which are installed in the repeating apparatus 16 as a computer and which include commands corresponding to these functions. The programs may be supplied to the repeating apparatus 16 by means of computer-readable information storage media such as optical disks, magnetic disks, magnetic tapes, magneto-optical disks or flash memories, or via the Internet, for example.

Also as illustrated in FIG. 4, the HMD 12 of this embodiment includes, functionally, for example, a video data reception section 100, a display control section 102, a sensing data generation section 104, a sensing data buffer 106, and a sensing data transmission section 108. The video data reception section 100 and the sensing data transmission section 108 are implemented using mainly the communication section 34. The display control section 102 is implemented using mainly the processor 30 and display section 38. The sensing data generation section 104 is implemented using mainly the processor 30, sensor section 40, and camera section 44. The sensing data buffer 106 is implemented main using the storage section 32.

The above-mentioned functions may also be implemented by the processor 30 executing programs which are installed in the HMD 12 as a computer and which include commands corresponding to these functions. The programs may be supplied to the HMD 12 by means of computer-readable information storage media such as optical disks, magnetic disks, magnetic tapes, magneto-optical disks or flash memories, or via the Internet, for example.

The video data generation section 70 of this embodiment generates, for example, the video data representing the video to be displayed on the display section 38 of the HMD 12.

The video data transmission section 72 of this embodiment transmits, for example, the video data generated by the video data generation section 70 to the repeating apparatus 16.

The generation control reception section 74 of this embodiment receives, for example, generation control information transmitted from the repeating apparatus 16. The generation control information here refers to the information indicating the size of the data to be generated per unit time, for example. The video data generation section 70 is controlled to generate per unit time the data of the size indicated by the generation control information in accordance with the generation control information being received by the generation control reception section 74.

The sensing data reception section 76 of this embodiment receives, for example, the sensing data such as the data indicating the results of detection by the sensor section 40 of the HMD 12 as well as the images captured by the camera section 44 from the repeating apparatus 16. The video data generation section 70 of this embodiment generates the video data reflecting the sensing data received by the sensing data reception section 76.

The target time information storage section 80 of this embodiment stores, for example, target time information in which the value of the above-mentioned target time TargetTransferTime is set.

The video data reception section 82 of this embodiment receives, for example, the video data transmitted from the entertainment apparatus 14.

The video data buffer 84 of this embodiment stores, for example, the video data received by the video data reception section 82.

The video data transmission section 86 of this embodiment transmits, for example, the video data stored in the video data buffer 84 to the HMD 12.

The sensing data reception section 88 of this embodiment receives, for example, the above-mentioned sensing data from the HMD 12.

The sensing data transmission section 90 of this embodiment transmits, for example, the sensing data received by the sensing data reception section 88 to the entertainment apparatus 14.

The required time identification section 92 of this embodiment identifies, for example, the time T_RT required for a round-trip half-duplex wireless communication completed between the repeating apparatus 16 and the HMD 12.

The bit rate determination section 94 of this embodiment determines, for example, a bit rate for permitting data transmission from the repeating apparatus 16 to the HMD 12. In this case, the bit rate may be determined, for example, in accordance with the identified time T_RT, the size of the data exchanged between the repeating apparatus 16 and the HMD 12 in a round-trip communication therebetween, and a predetermined target time TargetTransferTime for the round-trip communication. Also, the bit rate determination section 94 may determine a bit rate for permitting data transmission from the HMD 12 to the repeating apparatus 16. A method for determining the bit rates will be discussed later in detail. In the description that follows, the value of the bit rate for permitting data transmission from the repeating apparatus 16 to the HMD 12 will be referred to as the PayloadBitrate_PtoH. The value of the bit rate for permitting data transmission from the HMD to the repeating apparatus 16 will be referred to as the PayloadBitrate_HtoP hereunder.

Also, the bit rate determination section 94 may hold information indicating a maximum value and a minimum value of the bit rate for permitting data transmission from the repeating apparatus 16 to the HMD 12 in accordance with the specifications of the entertainment apparatus 14 and of the repeating apparatus 16. Furthermore, the bit rate determination section 94 may hold information indicating a maximum value and a minimum value of the bit rate for permitting data transmission from the HMD 12 to the repeating apparatus 16 in accordance with the specifications of the HMD 12. In the description that follows, the maximum value and minimum value of the bit rate for permitting data transmission from the repeating apparatus 16 to the HMD 12 will be referred to as Tp_PtoH_ReqMax and Tp_PtoH_ReqMin, respectively. The maximum value and minimum value of the bit rate for permitting data transmission from the HMD 12 to the repeating apparatus 16 will be referred to as Tp_HtoP_ReqMax and Tp_HtoP_ReqMin respectively hereunder.

The data size determination section 96 of this embodiment determines, for example, the size of data to be transmitted from the repeating apparatus 16 to the HMD 12 in a subsequent round-trip wireless communication therebetween. In this case, the size of the data to be transmitted from the repeating apparatus 16 to the HMD 12 in the subsequent round-trip wireless communication may be determined in accordance with the bit rate determined by the bit rate determination section 94 and on the basis of a predetermined target time TargetTransferTime, for example. Also, the data size determination section 96 may determine the size of the data to be transmitted from the HMD 12 to the repeating apparatus 16 in the subsequent round-trip wireless communication. In the description that follows, the size of the data to be transmitted from the repeating apparatus 16 to the HMD 12 in a round-trip wireless communication may be referred to as TransSize_PtoH. The size of the data to be transmitted from the HMD 12 to the repeating apparatus 16 in a subsequent round-trip wireless communication may be referred to as TransSize_HtoP hereunder.

Also, the data size determination section 96 of this embodiment holds, for example, information in which is set the value TransSize_PtoH of the size of the data to be transmitted from the repeating apparatus 16 to the HMD 12 in a round-trip wireless communication, the value being determined as described above. Furthermore, the data size determination section 96 of this embodiment may hold, for example, information in which is set the value TransSize_HtoP of the size of the data to be transmitted from the HMD 12 to the repeating apparatus 16 in a subsequent round-trip wireless communication, the value being determined as discussed above.

The generation control section 98 of this embodiment controls, for example, the size of data generated per unit time by the video data generation section 70. In this case, the data size may be determined in accordance with the time T_RT, with the size of the data exchanged with the HMD 12 in a round-trip communication, and with a predetermined target time TargetTransferTime for the round-trip communication, for example. Alternatively, the data size may be determined in keeping with the bit rate determined by the bit rate determination section 94. For example, the generation control section 98 may control the video data generation section 70 to generate the data of the size corresponding to the determined bit rate per unit time. Also, the generation control section 98 may transmit generation control information indicating the data size to the entertainment apparatus 14.

Also, the generation control section 98 may control such quality elements as the resolution and compression ratio of video data to be generated by the video data generation section 70 in accordance with the bit rate determined by the bit rate determination section 94.

As the accuracy of sensing data transmitted from the HMD 12 to the repeating apparatus 16 in a round-trip communication gets worse, the size of the sensing data becomes smaller. For this reason, it is not preferable to reduce the size of the sensing data. On the other hand, it is not much of a problem even if the quality of the data of the video being displayed drops. Thus, in the case where the bit rate for permitting data transmission from the repeating apparatus 16 to the HMD 12 drops, the occurrence of latency may be prevented by lowering such quality elements as the compression ratio and resolution of the video to be generated. This ensures the accuracy of the sensing data.

The video data reception section 100 of this embodiment receives, for example, the video data transmitted from the repeating apparatus 16.

The display control section 102 of this embodiment displays, for example, the video represented by the video data received by the video data reception section 100.

The sensing data generation section 104 of this embodiment generates, for example, the sensing data such as the data indicating the results of detection by the sensor section 40 of the HMD 12 and the images captured by the camera section 44.

The sensing data buffer 106 of this embodiment stores, for example, the sensing data generated by the sensing data generation section 104.

The sensing data transmission section 108 transmits the sensing data stored in the sensing data buffer 106 to the repeating apparatus 16.

Explained below with reference to the flowchart of FIG. 5 is a first example of the flow of processing performed by the repeating apparatus 16 of this embodiment to control the size of the video data to be generated per unit time by the entertainment apparatus 14. The first processing example in FIG. 5 applies advantageously to the case where the modulation encoding method for data transmission from the repeating apparatus 16 to the HMD 12 is the same as the modulation encoding method for data transmission from the HMD 12 to the repeating apparatus 16, for example. For the first processing example, it is assumed that the value PayloadBitrate_HtoP set in the information held by the bit rate determination section 94 is a constant value Tp_HtoP_ReqConst. It is also assumed for the first processing example that a processing loop from S101 to S110, to be discussed below, is repeatedly executed. It is further assumed that the processing from S101 to S110 is executed once every time a round-trip communication takes place between the repeating apparatus 16 and the HMD 12.

First, the video data transmission section 86 identifies the value TransSize_PtoH set in the information held by the data size determination section 96 (S101).

The video data transmission section 86 then acquires from the video data buffer 84 the video data of the size indicated by the value identified in the process of S101, and transmits the video data to the HMD 12 (S102).

The sensing data reception section 88 then receives the sensing data transmitted from the HMD 12 upon receipt thereby of the video data transmitted in the process of S102 (S103).

The required time identification section 92 then identifies the time T_RT depicted in FIG. 3 (S104).

The bit rate determination section 94 then calculates a value Tp_RT representing the amount of transmitted data (throughput) per unit time (S105). For example, the sum of the value TransSize_PtoH and of the value TransSize_HtoP is multiplied by eight, and the product of the multiplication is divided by the time T_RT identified in the process of S104. This provides the value Tp_RT. It is assumed here that the value TransSize_PtoH and the value TransSize_HtoP are in bytes and the value Tp_RT is in bits. Thus, in the process of S105, the number of bytes is multiplied by eight for conversion to the number of bits.

The bit rate determination section 94 then subtracts the value Tp_HtoP_ReqMax from the value Tp_RT calculated in the process of S105 to calculate a partial throughput value Tp_PtoH corresponding to the data transmission from the repeating apparatus 16 to the HMD 12 (S106).

On the basis of the value Tp_PtoH calculated in the process of S106, the bit rate determination section 94 then determines the above-mentioned value PayloadBitrate_PtoH (S107). In this case, for example, a clipping process is performed on the value Tp_PtoH identified as falling within a range from the value Tp_PtoH_ReqMin to the value Tp_PtoH_ReqMax, the result of the process being determined to be the value PayloadBitrate_PtoH. In the case where the value Tp_PtoH is smaller than the value Tp_PtoH_ReqMin, for example, the value Tp_PtoH_ReqMin is determined to be the value PayloadBitrate_PtoH. In another example, where the value Tp_PtoH is larger than the value Tp_PtoH_ReqMax, the value Tp_PtoH_ReqMax is determined to be the value PayloadBitrate_PtoH. In this case, the difference between the value Tp_PtoH and the value Tp_PtoH_ReqMax represents a margin for absorbing jitter. In yet another example, where the value Tp_PtoH is equal to or larger than the value Tp_PtoH_ReqMin and equal to or smaller than the value Tp_PtoH_ReqMax, the value Tp_PtoH is determined to be the value PayloadBitrate_PtoH.

The bit rate determination section 94 then performs a filtering process on the value PayloadBitrate_PtoH determined in the process of S107 so as to correct the value PayloadBitrate_PtoH (S108). For example, in the case where the wireless communication environment has changed and throughput has dropped, a beam-forming process may be carried out to search for optimum communication channels, causing the throughput to change in a short time. In order to address that situation, the value determined in the preceding loop may be supplemented with the value obtained by multiplying by a factor of one or less the difference between the value determined in the preceding loop and the value determined in the current loop to thereby correct the value PayloadBitrate_PtoH. This factor may be determined, for example, on the basis of the performance of the beam-forming process in search for communication channels and the responsiveness of the video data generation section 70. Also, the filtering process may be performed only if the value PayloadBitrate_PtoH drops, for example.

On the basis of the value PayloadBitrate_PtoH corrected in the process of S108, the data size determination section 96 then calculates the value TransSize_PtoH (S109). In this case, for example, the value PayloadBitrate_PtoH is multiplied by the value TargetTransferTime indicated by the target time information stored in the target time information storage section 80, and the product of the multiplication is divided by eight. This provides the value TransSize_PtoH. The process of division by eight is carried out here to convert the number of bits to the number of bytes. The value TransSize_PtoH held by the data size determination section 96 is then updated to the value calculated in the process of S109.

The generation control section 98 then transmits to the entertainment apparatus 14 the generation control information indicating the value PayloadBitrate_PtoH corrected in the process of S108 (S110), before returning to the process of S101. In this case, the generation control reception section 74 receives the generation control information, and the video data generation section 70 generates per unit time (e.g., per second) the data of the size corresponding to the value PayloadBitrate_PtoH.

The above-described processing loop from S101 to S110 is thus executed to determine the value PayloadBitrate_PtoH of the bit rate for permitting data transmission from the repeating apparatus 16 to the HMD 12 in a round-trip communication subsequent to the round-trip communication associated with the current loop.

In the first processing example, the above-mentioned filtering process of S108 may not be carried out. In this case, the value TransSize_PtoH is calculated on the basis of the value PayloadBitrate_PtoH determined in the process of S107.

Also, in the above process of S102, the video data transmission section 86 need not transmit to the HMD 12 the video data header including the data indicating the value PayloadBitrate_HtoP representing the constant value Tp_HtoP_ReqConst. In this case, the HMD 12 may generate per unit time (e.g., per second) the data of the size corresponding to the value PayloadBitrate_HtoP. For example, the size of the sensing data to be generated per unit time may be controlled.

Figure 6:
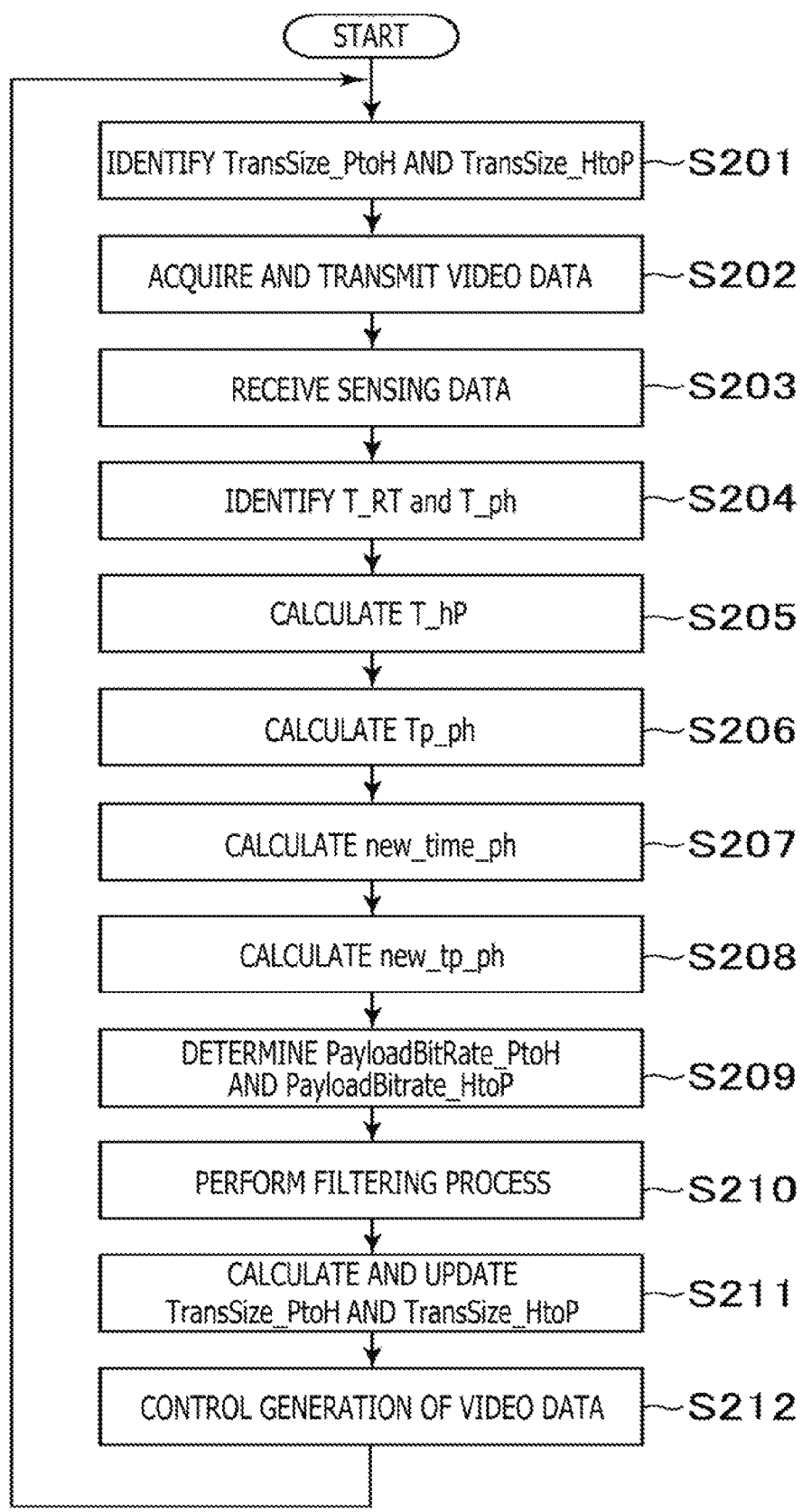
FIG. 6 is a flowchart depicting a second example of the flow of processing performed by the repeating apparatus of the embodiment of the present invention.

Explained next with reference to the flowchart of FIG. 6 is a second example of the flow of processing performed by the repeating apparatus 16 of this embodiment to control the size of the video data to be generated per unit time by the entertainment apparatus 14. Unlike the first processing example, the second processing example depicted in FIG. 6 involves using the result of estimation of the time required for data transmission from the repeating apparatus 16 to the HMD 12 in a round-trip communication. For the second processing example, it is assumed that a processing loop from S201 to S212, to be discussed below, is repeatedly executed. It is also assumed that the processing from S201 to S212 is executed once every time a round-trip communication takes place between the repeating apparatus 16 and the HMD 12.

First, the video data transmission section 86 identifies the value TransSize_PtoH and the value TransSize_HtoP set in the information held by the data size determination section 96 (S201).

The video data transmission section 86 then acquires from the video data buffer 84 the video data of the size indicated by the values identified in the process of S201, and transmits the video data to the HMD 12 (S202). In this processing example, the video data transmission section 86 at this point transmits the video data header including the data indicating the value PayloadBitrate_HtoP to the HMD 12. Upon receipt of the data, the HMD 12 generates per unit time (e.g., per second) the data of the size corresponding to the value PayloadBitrate_HtoP. For example, the size of the sensing data to be generated per unit time is controlled.

The sensing data reception section 88 then receives the sensing data transmitted from the HMD 12 in response to the video data transmission (S203).

The required time identification section 92 then identifies the time T_RT and the time T_ph depicted in FIG. 3 (S204).

The required time identification section 92 then subtracts the time T_ph from the time T_RT identified in the process of S204 so as to calculate a time T_hp corresponding approximately to the time required for sensing data transmission from the HMD 12 to the repeating apparatus 16 (S205).

The bit rate determination section 94 then multiplies the value TransSize_PtoH by eight and divides the product of the multiplication by the time T_ph identified in the process of S204. This provides a value Tp_ph representing the amount of transmitted data (throughput) per unit time (S206). It is assumed here that the value TransSize_PtoH is in bytes and the value Tp_ph is in bits. Thus, in the process of S105, the number of bytes is multiplied by eight for conversion to the number of bits.

The bit rate determination section 94 then calculates a time new_time_ph that can be allocated to the transmission of data from the repeating apparatus 16 to the HMD 12 (S207). In this case, for example, the time T_hp calculated in the process of S205 is subtracted from the value TargetTransferTime in the target time information stored in the target time information storage section 80, and a constant for absorbing jitter is further subtracted from the difference following the subtraction to provide the time new_time_ph. The constant may be a number corresponding to 5% to 10% of the value TargetTransferTime, for example.

The bit rate determination section 94 then identifies a partial throughput value new_tp_ph corresponding to the data transmission from the repeating apparatus 16 to the HMD 12 (S208). In this case, for example, the time new_time_ph calculated in the process of S207 is multiplied by the value Tp_ph calculated in the process of S206, and the product of the multiplication is divided by the value TargetTransferTime to identify the value new_tp_ph.

On the basis of the value new_tp_ph identified in the process of S208, the bit rate determination section 94 then determines the value PayloadBitrate_PtoH and the value PayloadBitrate_HtoP (S209).

It is assumed here that the value new_tp_ph is equal to or larger than a threshold value Tp_PtoH_LowThreshold for use in determining a worsening tendency of the communication environment. In the current case, a clipping process is performed on the identified value new_tp_ph in such a manner that the value will fall within the range from the retained value Tp_PtoH_ReqMin to value Tp_PtoH_ReqMax. The result of the clipping process is determined to be the value PayloadBitrate_PtoH. Also in this case, the value Tp_HtoP_ReqMax is determined to be the value PayloadBitrate_HtoP. Here, the threshold value Tp_PtoH_LowThreshold may be determined to be within the range from the value Tp_PtoH_ReqMin to the value Tp_PtoH_ReqMax inclusive.

Meanwhile, the value new_tp_ph is assumed to be smaller than the threshold value Tp_PtoH_LowThreshold. In this case, the value new_tp_ph is subtracted from the threshold value Tp_PtoH_LowThreshold, and the result of the subtraction is provided as a value delta_tp_ph. Then, the value delta_tp_ph is subtracted from the value Tp_HtoP_ReqMax, and the result of the subtraction is provided as a value new_tp_hp. In the case where the value new_tp_hp calculated here is smaller than the value Tp_HtoP_ReqMin, the value new_tp_hp is replaced with the value Tp_HtoP_ReqMin. The value new_tp_hp is then determined to be the value PayloadBitrate_HtoP. The value Tp_PtoH_ReqMin is determined to be the value PayloadBitrate_PtoH. In this manner, where the value new_tp_ph corresponding to the bit rate for permitting data transmission from the repeating apparatus 16 to the HMD 12 in a round-trip communication is smaller than the threshold value Tp_PtoH_LowThreshold, the size of the data to be transmitted per unit time by the HMD 12 in a subsequent round-trip communication is reduced.

The threshold value Tp_PtoH_LowThreshold may reflect the distance between the repeating apparatus 16 and the HMD 12 or the direction of the HMD 12 relative to the repeating apparatus 16. Here, the bit rate determination section 94 may identify the distance between the repeating apparatus 16 and the HMD 12 or the direction of the HMD 12 relative to the repeating apparatus 16 on the basis of the values of the sensing data received by the sensing data reception section 76. The bit rate determination section 94 may then determine the threshold value Tp_PtoH_LowThreshold in accordance with the identified distance or direction.

In this case, for example, the value obtained by dividing by two the sum of the value Tp_PtoH_ReqMax and value Tp_PtoH_ReqMin may be used as a reference value for the threshold value Tp_PtoH_LowThreshold. Also, the threshold value Tp_PtoH_LowThreshold may be determined in such a manner that the longer the distance between the repeating apparatus 16 and the HMD 12 is than a predetermined reference distance, the larger the threshold value Tp_PtoH_LowThreshold becomes than the reference value, for example. Alternatively, the threshold value Tp_PtoH_LowThreshold may be determined in such a manner that the shorter the distance between the repeating apparatus 16 and the HMD 12 is than a predetermined reference distance, the smaller the threshold value Tp_PtoH_LowThreshold becomes than the reference value. As another alternative, the threshold value Tp_PtoH_LowThreshold may be determined in such a manner that the larger the angle between the direction from the user wearing the HMD 12 toward the repeating apparatus 16 and the direction from the back of the head of the user wearing the HMD 12 toward the front of the user's head is than a predetermined reference angle, the larger the threshold value Tp_PtoH_LowThreshold becomes than the reference value. As a further alternative, the threshold value Tp_PtoH_LowThreshold may be determined in such a manner that the smaller the angle between the direction from the user wearing the HMD 12 toward the repeating apparatus 16 and the direction from the back of the head of the user wearing the HMD 12 toward the front of the user's head is than a predetermined reference angle, the smaller the threshold value Tp_PtoH_LowThreshold becomes than the reference value.

The bit rate determination section 94 then executes a filtering process similar to the one in the process of S108 (S210). Here, the value PayloadBitrate_PtoH determined in the process of S209 is corrected when subjected to the filtering process. Also, the value PayloadBitrate_HtoP is corrected when subjected to the filtering process.

The data size determination section 96 then calculates the value TransSize_PtoH and the value TransSize_HtoP (S211). In this case, for example, the corrected value PayloadBitrate_PtoH may be multiplied by the value TargetTransferTime indicated by the target time information stored in the target time information storage section 80, and the product of the multiplication may be divided by eight to provide the value TransSize_PtoH. Also, the corrected value PayloadBitrate_HtoP may be multiplied by the value TargetTransferTime indicated by the target time information stored in the target time information storage section 80, and the product of the multiplication may be divided by eight to provide the value TransSize_HtoP. The process of division by eight is carried out here to convert the number of bits to the number of bytes. The value TransSize_PtoH and the value TransSize_PtoH held by the data size determination section 96 are then updated to the values calculated in the process of S211.

The generation control section 98 then transmits to the entertainment apparatus 14 the generation control information indicating the value PayloadBitrate_PtoH corrected in the process of S210, before returning to the process of S201 (S212). In this case, the generation control reception section 74 receives the generation control information, and the video data generation section 70 generates per unit time (e.g., per second) the data of the size corresponding to the value PayloadBitrate_PtoH. In the second processing example, as discussed above, the above-described processing from S201 to S212 is repeatedly executed.

In the second processing example, where the value new_tp_ph corresponding to the bit rate for permitting data transmission from the repeating apparatus 16 to the HMD 12 in a round-trip communication drops below the threshold value Tp_PtoH_LowThreshold, the value PayloadBitrate_HtoP determined in the processes of S209 and S210 is reduced. In this case, during the process of S202 of the next loop, the video data transmission section 86 transmits to the HMD 12 an instruction to reduce the size of the data to be transmitted per unit time in a subsequent round-trip communication. In the second processing example, as described, the repeating apparatus 16 is enabled to control the bit rate of the data to be transmitted from the HMD 12 to the repeating apparatus 16.

In the second processing example, the above-mentioned filtering process in S210 may not be carried out. In this case, the value TransSize_PtoH is calculated on the basis of the value PayloadBitrate_PtoH determined in the process of S209. Also, the value TransSize_HtoP is calculated on the basis of the value PayloadBitrate_HtoP determined in the process of S209.

As discussed above, the video data generation section 70 here may change such quality elements as the resolution and compression ratio of the video to be generated in keeping with changes in the value indicated by the generation control information transmitted in the process of S110 or S212. For example, if the value indicated by the generation control information drops, the quality of the video generated by the video data generation section 70 may be lowered.

In this embodiment, a time value of four milliseconds, for example, is assumed to be the value of the target time TargetTransferTime. Then, 125 kilobytes of video data is written to the video data buffer 84 per millisecond, for example. In the description that follows, the video data written all at once to the video data buffer 84 (125 kilobytes of video data in this case) will be referred to as one block. In a case where the value of the target time TargetTransferTime is four milliseconds, the video data transmission section 86 should preferably transmit four blocks of video data (e.g., 500 kilobytes of video data in this case) every four milliseconds. Also, the sensing data transmission section 104 should preferably transmit one megabyte of sensing data every four milliseconds.

Also in this embodiment, the video data transmission section 86 may transmit video data in units of a block of a predetermined size. For example, if the identified value TransSize_PtoH is 250 kilobytes, the video data transmission section 86 may transmit two blocks of video data (e.g., 250 kilobytes of video data in this case) in a round-trip communication. Also in this case, the blocks written to the video data buffer 84 may be consecutively acquired and transmitted two blocks at a time in newest-first order.

It is to be noted that the above-described embodiment is not limitative of the present invention.

For example, part or all of the functions indicated in FIG. 4 as the functions of the entertainment apparatus 14 may be incorporated in the HMD 12 or in the repeating apparatus 16. Also, part or all of the functions indicated in FIG. 4 as the functions of the repeating apparatus 16 may be incorporated in the HMD 12 or in the entertainment apparatus 14.

Furthermore, specific character strings and numerical values mentioned in the above description as well as specific character strings and numerical values noted in the accompanying drawings are only examples and are not limitative of the present invention.

The invention claimed is:

1. A communication apparatus for performing half-duplex wireless communication with a communication partner apparatus, the communication apparatus comprising:
    an entertainment apparatus comprising a data generation section and configured to transmit data generated by the data generation section to the communication partner as output signals;
    a repeating apparatus in communication with said entertainment apparatus, said repeating apparatus configured to repeat transmission of said output signals and receive data transmitted from the communication partner apparatus, said repeating apparatus comprising:
    a transmission section configured to transmit the data generated by the data generation section to the communication partner apparatus;
    a reception section configured to receive the data transmitted from the communication partner apparatus;
    a time identification section configured to identify a time required for a round-trip half-duplex wireless communication between the repeating apparatus and the communication partner apparatus;
    a generation control section configured to control a size of the data to be generated per unit time by the data generation section of the entertainment apparatus on a basis of the identified time, the size of the data exchanged with the communication partner apparatus in the round-trip communication, and a predetermined target time for the round-trip communication; and
    a bit rate determination section configured to determine a bit rate for permitting data transmission from the communication apparatus to the communication partner apparatus in a subsequent round-trip communication in accordance with the identified time, the size of the data exchanged with the communication partner apparatus in the round-trip communication, and the predetermined target time for the round-trip communication,
    wherein the generation control section controls the size of the data generated per unit time by the data generation section in accordance with the determined bit rate,
    wherein in a case where the bit rate for permitting data transmission from the communication apparatus to the communication partner apparatus in the round-trip communication is lower than a threshold value, the transmission section transmits to the communication partner apparatus an instruction to reduce the size of the data to be transmitted per unit time in the subsequent round-trip communication.

2. The communication apparatus according to claim 1, wherein
    the reception section receives sensing data transmitted from the communication partner apparatus, the data generation section generates video data, and
    the generation control section controls a quality of the video data.

3. The communication apparatus according to claim 1, wherein the repeating apparatus further comprises: a bit rate determination section configured to determine a bit rate for permitting data transmission from the communication apparatus to the communication partner apparatus in a subsequent round-trip communication in accordance with the identified time, the size of the data exchanged with the communication partner apparatus in the round-trip communication, and the predetermined target time for the round-trip communication,
    wherein the generation control section controls the size of the data generated per unit time by the data generation section in accordance with the determined bit rate.

4. The communication apparatus according to claim 1, wherein the threshold value reflects either a distance between the communication apparatus and the communication partner apparatus or a direction of the communication partner apparatus relative to the communication apparatus.

5. The communication apparatus according to claim 1, wherein the communication partner apparatus comprises:
    a head mounted display (HMD) comprising:
        a sensing section, and
        a camera section,
    wherein the data transmitted from the communication partner to the entertainment apparatus by way of the repeating apparatus comprises sensing data from the HMD, said sensing data comprises acceleration and angular velocity detected by the sensor section and images captured by the camera section.

6. A method for controlling a generated data size comprising:
    transmitting data generated by a data generation section of a communication apparatus to a communication partner apparatus, wherein the communication apparatus comprises: (i) an entertainment apparatus comprising the data generation section and configured to transmit the data generated by the data generation section to the communication partner as output signals, and (ii) a repeating apparatus in communication with said entertainment apparatus, said repeating apparatus configured to repeat transmission of said output signals and receive data transmitted from the communication partner apparatus;
    transmitting the data generated by the data generation section to the communication partner apparatus;
    receiving data transmitted from the communication partner apparatus;
    identifying a time required for a round-trip half-duplex wireless communication between the repeating apparatus and the communication partner apparatus;
    controlling a size of the data to be generated per unit time by the data generation section on a basis of the identified time, the size of the data exchanged with the communication partner apparatus in the round-trip communication, and a predetermined target time for the round-trip communication;

determining a bit rate for permitting data transmission from the communication apparatus to the communication partner apparatus in a subsequent round-trip communication in accordance with the identified time, the size of the data exchanged with the communication partner apparatus in the round-trip communication, and the predetermined target time for the round-trip communication, wherein the generation control section controls the size of the data generated per unit time by the data generation section in accordance with the determined bit rate, and wherein in a case where the bit rate for permitting data transmission from the communication apparatus to the communication partner apparatus in the round-trip communication is lower than a threshold value, the transmission section transmits to the communication partner apparatus an instruction to reduce the size of the data to be transmitted per unit time in the subsequent round-trip communication.

7. A non-transitory, computer readable storage medium containing a computer program, which when executed by a computer, causes the computer to carry out actions for controlling a generated data size, comprising:

transmitting data generated by a data generation section of a communication apparatus to a communication partner apparatus, wherein the communication apparatus comprises: (i) an entertainment apparatus comprising a data generation section and configured to transmit data generated by the data generation section to the communication partner as output signals, and (ii) a repeating apparatus in communication with said entertainment apparatus, said repeating apparatus configured to repeat transmission of said output signals and receive data transmitted from the communication partner apparatus;

transmitting data generated by the data generation section to the communication partner apparatus;

receiving data transmitted from the communication partner apparatus;

identifying a time required for a round-trip half-duplex wireless communication between the repeating apparatus and the communication partner apparatus transmitting; and controlling a size of the data to be generated per unit time by the data generation section on a basis of the identified time, the size of the data exchanged with the communication partner apparatus in the round-trip communication, and a predetermined target time for the round-trip communication; and determining a bit rate for permitting data transmission from the communication apparatus to the communication partner apparatus in a subsequent round-trip communication in accordance with the identified time, the size of the data exchanged with the communication partner apparatus in the round-trip communication, and the predetermined target time for the round-trip communication, wherein the generation control section controls the size of the data generated per unit time by the data generation section in accordance with the determined bit rate, and wherein in a case where the bit rate for permitting data transmission from the communication apparatus to the communication partner apparatus in the round-trip communication is lower than a threshold value, the transmission section transmits to the communication partner apparatus an instruction to reduce the size of the data to be transmitted per unit time in the subsequent round-trip communication.

\* \* \* \* \*